United States Patent
Macy (10) Patent No.: US 12,112,614 B2
(45) Date of Patent: Oct. 8, 2024

(54) SECURE COMMUNICATIONS FOR MONITORED FACILITIES

(71) Applicant: SECURE UTILITY, Ottawa (CA)

(72) Inventor: Mark Macy, Ottawa (CA)

(73) Assignee: PUBLIC SAFETY COUNCIL CORP., Ottawa (CA)

( * ) Notice: Subject to any disclaimer, the term of this patent is extended or adjusted under 35 U.S.C. 154(b) by 0 days.

(21) Appl. No.: 17/640,727

(22) PCT Filed: Sep. 4, 2020

(86) PCT No.: PCT/CA2020/051200
§ 371 (c)(1),
(2) Date: Mar. 4, 2022

(87) PCT Pub. No.: WO2021/042213
PCT Pub. Date: Mar. 11, 2021

(65) Prior Publication Data
US 2022/0319302 A1    Oct. 6, 2022

Related U.S. Application Data

(60) Provisional application No. 62/896,959, filed on Sep. 6, 2019.

(51) Int. Cl.
G08B 25/14     (2006.01)
G08B 25/00     (2006.01)
G08B 25/01     (2006.01)
H04N 7/18      (2006.01)

(52) U.S. Cl.
CPC ......... *G08B 25/016* (2013.01); *G08B 25/003* (2013.01); *G08B 25/14* (2013.01); *H04N 7/18* (2013.01)

(58) Field of Classification Search
CPC .... G08B 25/016; G08B 25/003; G08B 25/14; G08B 25/10; H04N 7/18; H04L 9/3239; H04L 9/50; H04L 63/0272; H04L 63/0428; H04W 4/33; H04W 4/14; H04W 4/90; G06F 21/78
See application file for complete search history.

(56) References Cited

U.S. PATENT DOCUMENTS

2016/0171853 A1* 6/2016 Naidoo ............... H04L 12/2836
                                                                  348/143
2018/0343505 A1* 11/2018 Loheide ............. H04N 21/2353
2019/0057115 A1*  2/2019 Liu ....................... H04L 9/0825

* cited by examiner

*Primary Examiner* — Omeed Alizada
(74) *Attorney, Agent, or Firm* — Brion Raffoul (57) ABSTRACT

Systems and methods relating to secure communications for use with monitored facilities. A segregated private network is provided where the network only allows properly credentialed users to use the network. Only traffic destined for addresses internal to the private network are allowed within the network. Access nodes control access to the private network while other types of traffic for the network, including radio and text messaging traffic may also use the private network for a secure communications link between source and destination nodes. Preferably, the communication links are end to end encrypted. As well, preferably, video and data streams from monitored facilities are transmitted to central monitoring offices using the private network.

6 Claims, 4 Drawing Sheets

SECURE COMMUNICATIONS FOR MONITORED FACILITIES

CROSS REFERENCE TO RELATED APPLICATIONS

This application is a 35 U.S.C. 371 national stage filing and claims priority to International Application No. PCT/CA2020/051200 filed on Sep. 4, 2020, entitled: "SECURE COMMUNICATIONS FOR MONITORED FACILITIES" which claims the benefit of U.S. Provisional Application No. 62/896,959 filed on Sep. 6, 2019, each of which are incorporated herein by reference in their entirety.

TECHNICAL FIELD

The present invention relates to secure communications for managed facilities.

More specifically, the present invention relates to systems and methods for managing and providing secure electronic communications for such facilities.

BACKGROUND

The early 21st century has seen the rise of multiple security threats throughout the world. From radical extremists to rogue states to civil unrest, the threats to people and property have multiplied. Developing in parallel to this are security technologies that can be used to assist in mitigating such threats. From security cameras to mobile devices carried by the public, these technologies can be used to monitor situations and to alert authorities to emergencies as such emergencies arise. However, from the standpoint of managed facilities, such technologies, while useful, are not as effective as they could be.

One example of the above are security cameras that are deployed in managed facilities such as office buildings, shopping centers, secure residential buildings, and the like. These cameras are useful in monitoring specific areas of such facilities yet, when an emergency arises, sometimes the best that on-site security can do is to call emergency services. In some instances, the footage that is captured, though helpful, is unavailable to local law enforcement authorities in real time.

Another possible issue with such security cameras is that the video feed from these cameras are well-known as being easy to intercept or hack. In many cases, the video feed may be transmitted, unencrypted, from the camera to a monitoring station or to a central station by way of the Internet. This gives rise to many privacy and security concerns, not just for the facility but for the public in general as well.

It should therefore be clear that there is a need for systems and/or methods that allow for secure communications between managed facilities and managed security monitoring stations. As well, there is a need for such systems that provide for secured communications between individuals stationed at such facilities and the monitoring stations.

SUMMARY

The present invention provides systems and methods relating to secure communications for use with monitored facilities. A segregated private network is provided where the network only allows properly credentialed users to use the network. Only traffic destined for addresses internal to the private network are allowed within the network. Access nodes control access to the private network while other types of traffic for the network, including radio and text messaging traffic may also use the private network for a secure communications link between source and destination nodes. Preferably, the communication links are end to end encrypted. As well, preferably, video and data streams from monitored facilities are transmitted to central monitoring offices using the private network.

In a first aspect, the present invention provides a method for managing security communications for a monitored facility, the method comprising:

providing a segregated private data network, said private data network being physically and logically segregated from other data networks and being physically and logically segregated from the Internet;

receiving data communications from devices located at said monitored facility;

routing said data communications through said private data network to a destination that is within said private data network;

wherein said private data network only allows traffic internal to said private data network to propagate through said private data network.

In a second aspect, the present invention provides a method for documenting a video stream from a video source, the method comprising:

receiving said video stream;

receiving a command to forward said video stream to a destination address;

forwarding said video stream to said destination address;

creating an entry including details about said video stream;

sending said entry to a blockchain based storage server for storage;

wherein said blockchain based storage server causes a duplication of said entry in at least one other blockchain based storage server; and wherein said blockchain based storage server is within a a segregated private data network, said private data network being physically and logically segregated from other data networks and being physically and logically segregated from the Internet.

In another aspect, the present invention provides a method for forwarding at least one data stream, the method comprising:

receiving said at least one data stream at a security monitoring center, said at least one data stream being from a monitored facility;

determining that an emergency situation exists at said monitored facility;

determining a location of said monitored facility;

providing a location menu to personnel at said security monitoring center;

receiving input from said personnel detailing a location of said monitored facility, said location of said monitored facility comprising a city;

receiving input from said personnel by way of a menu item that activates communications with emergency personnel at an emergency service authority in said city;

forwarding said at least one data stream to a preprogrammed and hidden network address, said network address corresponding to said emergency service authority;

wherein said menu item hides contact information for said emergency personnel from said personnel at said security monitoring center.

In yet another aspect, the present invention provides a method for alerting monitored facilities about an emergency situation at a specific monitored facility, the method comprising:

determining that an emergency situation exists at said specific monitored facility;
  contacting at least one emergency service authority that is local to said specific monitored facility;
  transmitting an alert to personnel at other monitored facilities about said emergency situation, said other monitored facilities being in a same city as said specific monitored facility.

In another aspect, the present invention provides a system for secured communications for a monitored facility, the system comprising:

a segregated private data network, said private data network being physically and logically segregated from other data networks and being physically and logically segregated from the Internet;
  at least one device located at said monitored facility;
  a plurality of access nodes for controlling network traffic within said private data network;
wherein
  said private data network is for securely transporting data communications to and from said monitored facility;
  said private data network only allows traffic internal to said private data network to propagate through said private data network using said access nodes.

BRIEF DESCRIPTION OF THE DRAWINGS

The embodiments of the present invention will now be described by reference to the following figures, in which identical reference numerals in different figures indicate identical elements and in which.

DETAILED DESCRIPTION

The various aspects of the present invention provide systems, methods, and devices that allow for secure communications between managed/monitored facilities (such as secure office buildings, secure apartment complexes, shopping centers, and the like) and centralized monitoring stations or centralized security offices that may be physically remote from the managed facilities themselves. Additionally, the various aspects of the present invention also allow for faster and more secure access to emergency services as well as access to other secure facilities in the vicinity of the managed facilities.

In one aspect of the present invention, there is provided a communications network that is logically and physically segregated from the Internet. It should be clear that this network is segregated from the wider Internet by way of access point modules. These access point modules only allow in packets or data transmission units from the Internet that are designated as having destination addresses within the segregated network. Of course, the access point modules are also equipped with encryption/decryption submodules that are able to encrypt/decrypt packets as necessary. Alternatively, the access point modules may encrypt/decrypt packets/data transmission units using a general purpose CPU. Packets that do not meet the requirements for the segregated network (including protocol requirements, permission requirements, encryption requirements, and addressing requirements) are not allowed into the segregated network. As well, packets originating from within the segregated network with destinations being in the wider Internet are also not allowed to leave the segregated network unless other requirements (including permission requirements) are met. These outbound packets may also be discarded if the stringent requirements set for the access point modules are not met. It should be clear that, within the segregated network are servers, user devices, routers, and other well-known network devices. Such devices are, however, only allowed to communicate with other devices within the segregated network unless they are provided special access to communicate with devices external to the segregated network. As a default, devices within the segregated network are not allowed to communicate/exchange packets with devices outside of the segregated network. Thus, communications traffic within the segregated network is, for the most part, traffic destined for devices within the segregated network.

It should be clear that the segregated network has the advantage of a certain homogeneity of traffic. By only allowing devices within the segregated network to communicate within that network, rogue packets and applications are not allowed to spread and/or propagate through the network. Theoretically, this measure should significantly cut down if not eliminate the risk of software worms, spam, and other unwanted traffic. As well, any unfriendly applications that may need to communicate with rogue websites or rogue servers will be rendered ineffective as their traffic would not be allowed to propagate through the segregated network.

Figure 1:
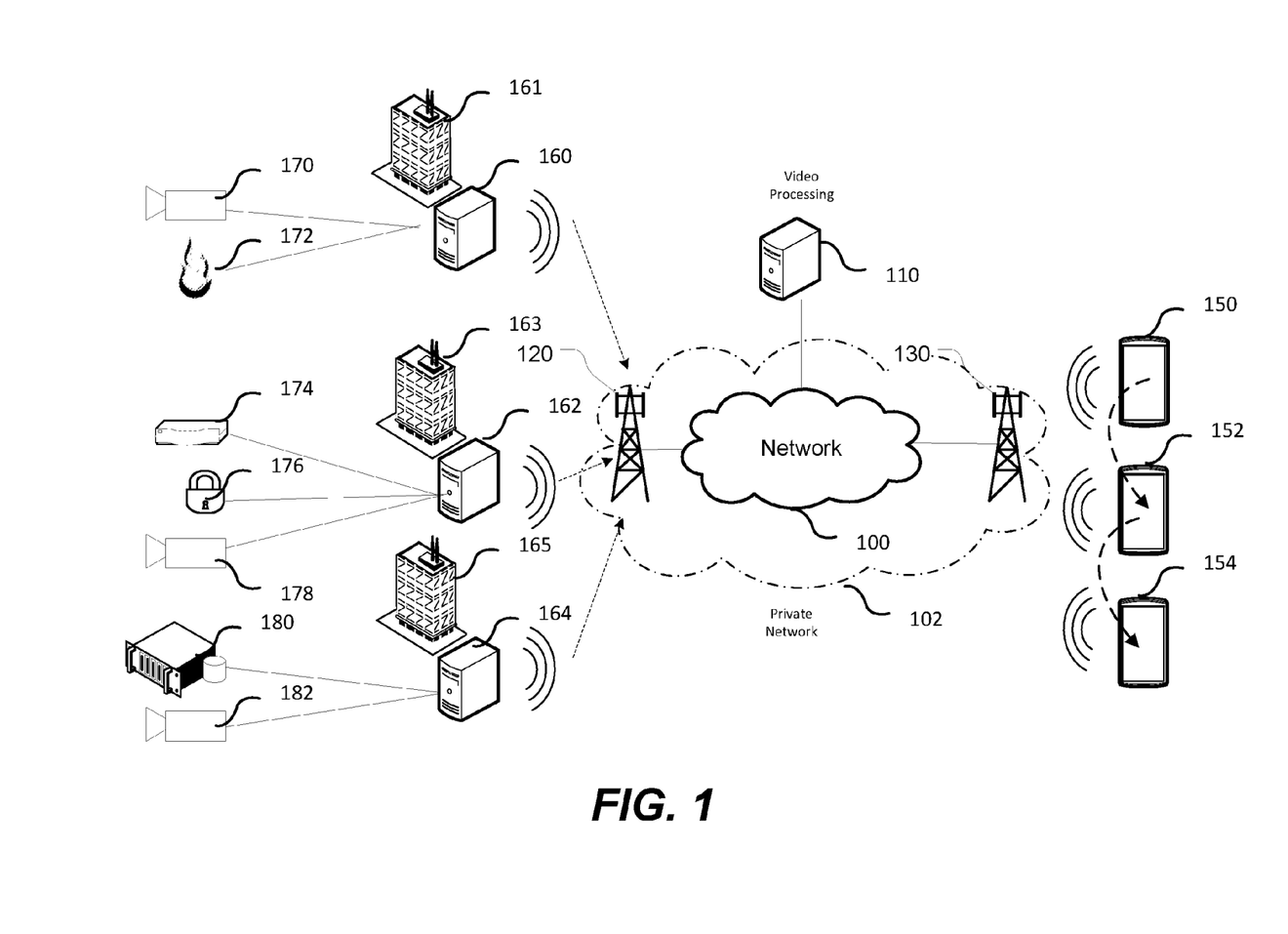
FIG. 1 is a block diagram of a system according to one aspect of the present invention.

Referring to FIG. 1, a diagram of a segregated network according to one aspect of the present invention is illustrated. In the implementation illustrated, the segregated network is a private network within a cellular carrier's network. As well, in this specific implementation, the segregated network is utilized as a communication network for use in communicating with and managing building or facility operating technologies. In this implementation, there is a secure private network using wireless infrastructure 120, 130. The infrastructure is utilized by a private network generated 102 within a cellular carrier's network 100. The private network is not visible to the general users of the cellular network and can be concealed to provide further security. An access control node 160, 162, 164 at the building premises 161, 163, 165 provides DNS and NAT functions for consumer devices that are located within the premises of the building devices, with the consumer devices gaining access to the cellular private network by way of the access control nodes. In addition, the access control nodes provide a firewall and can act as a video gateway. For video gateway applications the access control nodes can also provide pattern recognition services to identify different patterns during the various times of day within the building or external to the building and generate alerts when those patterns change. The consumer devices, such as smart phones, tablets or PCs 150, 152, 154, can access the private network by using a location specific IP address which allows for the establishment of a secure connection with the access control node. To further control access to the information related to the building/facility, a remote server may be utilized to manage encryption key access and user control.

The system provides secure, remote connectivity to all building operating technologies, regardless of manufacturer, and protects devices using such technologies from cyber threats. The system improves building operating technology security while retiring existing phone lines and Internet connections, thereby reducing operating costs. For example, access to devices 170-182 is provided using at least one central access node. These devices may, of course, include fire and intrusion alarm monitoring panels, building automation systems and HVAC, elevator entrapment phones, payment kiosks for parking and laundry, building entry phones, utility meters, access control systems, thermostats, lights, etc., and video surveillance systems (VSS & CCTV). In addition, other devices that may use the system include: network video recorders (NVRs), handheld transceivers, access control readers, access control panels, mobile devices configured for communications for security applications, emergency alarm systems, building lighting controls, building thermostat controls, two-way portable radios, building automation systems, and building entry telephone intercom systems (e.g. using VOIP technology).

In one implementation, the access control nodes do not reside on the public facing Internet. The devices that embody the nodes operate on the infrastructure of mobile network carriers and provide priority access to the mobile network carriers. The access control nodes each provide access to the segregated and secure private network behind a firewall which is updated in real time when malicious codes or malicious data packets are identified.

The management of video streams or feeds from cameras or devices located at the facility may also be provided to external data centres to enable processing of the video content as well as the identification of any pertinent events.

The scheme illustrated in FIG. 1 allows for properly credentialed users or systems to securely access data and/or video feeds from a building or facility whose devices are within the segregated network. To access information, including video feeds, from the particular building site or facility, a properly credentialed user enters or selects a location to which they have access to on the secure network via a suitable application or browser. This credentialed user can then connect to devices within the facility and access, for example, video streams from within this facility. The user can then share the video streams using suitable access privileges such that the first user shares the stream or video feed to a limited number of subsequent equally credentialed users. The user may, for example share the link to a video feed or a data feed with an emergency services dispatch location for services associated with emergency numbers such as 911, 112, or 999. This link would provide direct access to the data streams such as video, alarm conditions, fire suppression systems, etc. The data link that is provided can also have an inherent expiration such that, after the expiry of the link, the link no longer provides a user with access to the content. In addition, upon forwarding the link, if the credentialed user has not been previously verified, their access to control devices or to view particular content at the location may be limited.

It should be clear from the above that only credentialed users or those with suitable access to the system can access the video or data feeds from the facility and that only these users are able to forward the link to the video or data feeds to the emergency services dispatch. Users with insufficient credentials would not be able to access the video feeds or the data feeds. Note, however, that there may be varying levels of access to these feeds. As such, some users may have access to all the video feeds but not to the control features for the video feeds nor to the data feeds from the facility. Some users, however, would have complete access to the various data and video feeds from the facility. Users would, of course, be able to forward any video or data feeds to which they have access to the emergency services dispatch.

It should also be clear that the users noted in the above scheme may not necessarily be individuals but may be data and/or security management centres that are physically remote from the facility being monitored/managed. As an example, the video and data feeds from the facility may be fed to an off-site data and video monitoring centre where security and management personnel may monitor the video and data feeds. If an emergency situation is detected, either by the monitoring personnel off-site or on-site security personnel may alert the relevant emergency services and may forward the video and/or data feeds to the emergency services officers/office.

In FIG. 1, the access control nodes 160, 162, 164 or other components of the system may operate as video gateways that receive, encode, encrypt, and then forward video streams from the monitored or managed facilities. These video streams are encoded and encrypted at the video gateway and are then sent to the owner of the video, e.g. a security monitoring firm or a central monitoring office for the facility. The owner of the video can then forward that video from their location to others such as emergency services entities. At no time does the video gateway or any component of the system create or keep copies of the video streams as these streams are forwarded to their owners and the owners have control over who to forward the streams to or whether copies are to be created or not.

To assist in ensuring the security of the segregated network, each communications link between any two points in the segregated network can be encrypted such that any data exchange between the two points is encrypted. This end to end encryption can be implemented by implementing a protocol at both ends of any communications link such that, as each link is being established, encryption protocols are negotiated and established between the two end points. Once the encryption details have been decided, then the communications link can be established such that there is end-to-end encryption on the communications link. It should be clear that this end to end encryption can also be implemented for any communications link that has at least one end point within the segregated network. For video streams, the video stream can be encrypted at a video gateway or at the video source (e.g. at the video camera). Note that, it is to be understood that the source of the video stream can be considered to be the video gateway such that the video stream can be considered to be encrypted at the video gateway.

Figure 2:
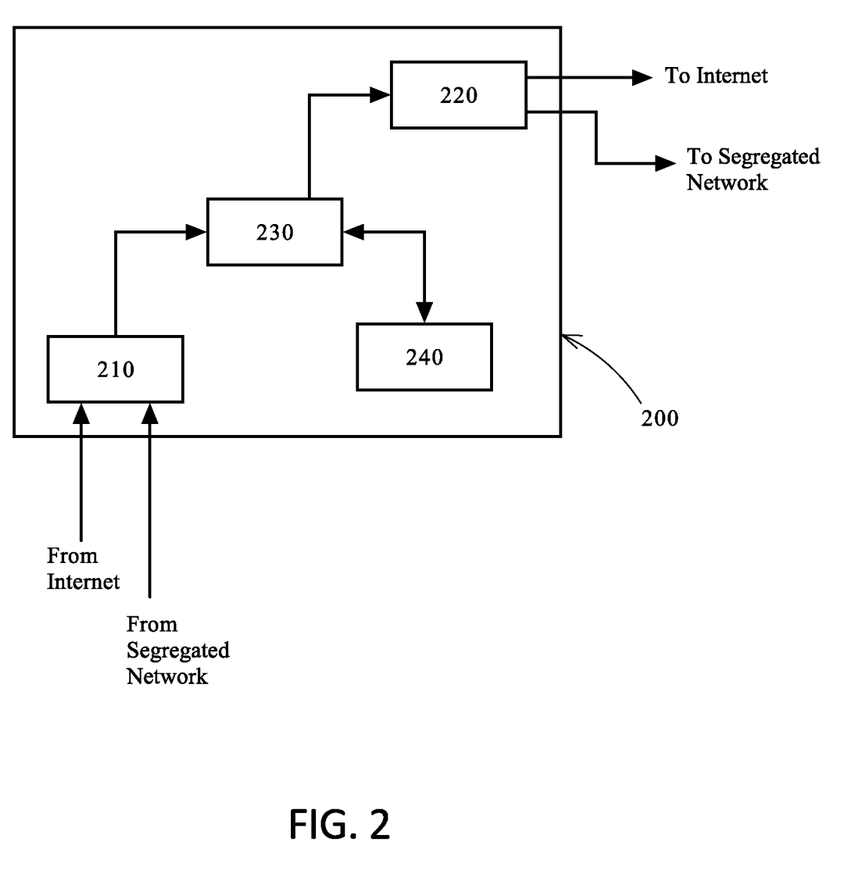
FIG. 2 is a block diagram of a component of the system illustrated in FIG. 1.

Referring to FIG. 2, a block diagram of an access node or access control node for the segregated network is illustrated. As noted above, this access node/access control node controls access to data entering or leaving the segregated network. In some implementations, these access nodes also provide access to the segregated network for properly credentialed consumer devices. From FIG. 2, it can be seen that the device 200 includes an input module 210, an output module 220, a CPU 230, and a database/data storage 240. The data storage 240 contains data signatures of various malicious codes as well as encryption/decryption keys and suitable access codes for the segregated network. Data, including data packets and other network traffic, is received at the input module 210. This data is then fed to the CPU 230. The CPU 230 then scans the data for data signatures of malicious codes and, if found, the relevant data packets/data is discarded. As well, the CPU 230 scans the data traffic for access codes to the segregated network. If the data traffic includes such access codes, then the data traffic is forwarded to the output module 220 to be output to the segregated network. If the data traffic does not have such access codes but is listed as having a destination that is within the segregated network, the data traffic is discarded or otherwise prevented from accessing the segregated network. Similarly, if the data traffic indicates a destination that is outside of the segregated network, then that data traffic is routed by the output module 220 to that destination external to the segregated network. In addition to the above, the data traffic received by the CPU is encrypted/decrypted as necessary. If the data traffic is unrecognized by the CPU, the data traffic is discarded. It should be clear that the access node or the access control node may also encrypt any outgoing traffic and can decrypt incoming encrypted traffic. This may include encrypting any outgoing video streams or decrypting any incoming text/document based communications.

For clarity, the input and output modules are, preferably, equipped to handle all manners of wireless traffic, including 4G and 5G traffic. Also for clarity, while the above explanation details a segregated network that has a wireless network as a front facing interface, other implementations that use a wired network are, of course, possible. Similarly, while the above discusses a segregated network that has a wireless infrastructure, a wired infrastructure is also possible.

It should be clear that the node receives traffic from both the wider Internet as well as from the segregated network. Data from the segregated network with a destination that is external to the segregated network is forwarded by the node to the wider Internet as necessary. Data from the segregated network with a destination that is within the segregated network is forwarded back to the segregated network as necessary. However, data from the wider Internet with a destination that is within the segregated network is filtered as necessary to ensure that that traffic is authorized to access the segregated network. As noted above, this filtering may take the form of determining whether suitable access codes and/or encryption are present in the data traffic. If the suitable access codes are not present or if suitable encryption is not present, the data traffic may either be discarded or be processed or filtered further. Of course, if the data traffic is found to be unauthorized or lacking the proper credentials for access to the segregated network, this data traffic is discarded by the CPU.

It should also be clear that the filtering executed by the access node may be performed on a per data packet basis or on a per stream basis. As an example, for a video data stream, the beginning of the data stream may have the proper credentials to access a destination within the segregated network and subsequent data packets for that steam may not need to be scanned/filtered by the access node. However, other data streams that may not require transmission constraints may be filtered/processed on a per packet basis.

As noted above, the video feeds from the monitored facility may be forwarded by authorized or credentialed users to other credentialed users or to emergency services dispatch officers/personnel. When doing so, the video feed may be authenticated, and the forwarding may be noted in one or more servers located within the segregated network. This ensures that the trail of forwarding and the route by which the video feed reaches a destination is documented. This ensures that the video feed being viewed/forwarded has not been tampered with or, if it has been tampered with, then the source of the tampering can be limited to a smaller number of potential suspects. As noted above, the video streams are forwarded from the original recipient to the subsequent forwardee.

The above documentation of the route of the video feeds or data feeds can be implemented by using blockchain technology. The documentation of the forwarding of the video feed can be stored using blockchain technology in a server within the segregated network and, in keeping with blockchain technology protocols, other servers can be used to duplicate and store that documentation. This ensures that the documentation cannot be tampered with as multiple copies would ensure that any tampering of the documentation is discovered. It should be clear that the documentation may include not simply the IP address of the destination for the video feed (i.e. where the video feed is forwarded to) but also the IP address of the forwarding user/party, along with other identifying information for the video feed. This can be implemented by adding a protocol to the server producing the video feed such that every time a new destination IP address is received by the server, the server documents the destination IP address and stores the details about the command (i.e. the time the command to forward the video stream, the destination IP address, the IP address of the forwarding command, and the time the forwarding command was executed, the location/address of the camera whose video feed is being forwarded, etc.) in the blockchain server. Storing the details in the blockchain server will eventually cause that documentation to be copied and distributed to the other blockchain-based servers. Depending on the settings of the server producing the video feed, the video feed can also be fingerprinted (i.e. a hash of the video feed is produced) and this fingerprint of the video feed can also be stored in the blockchain server(s) for propagation across the blockchain network.

Figure 3:
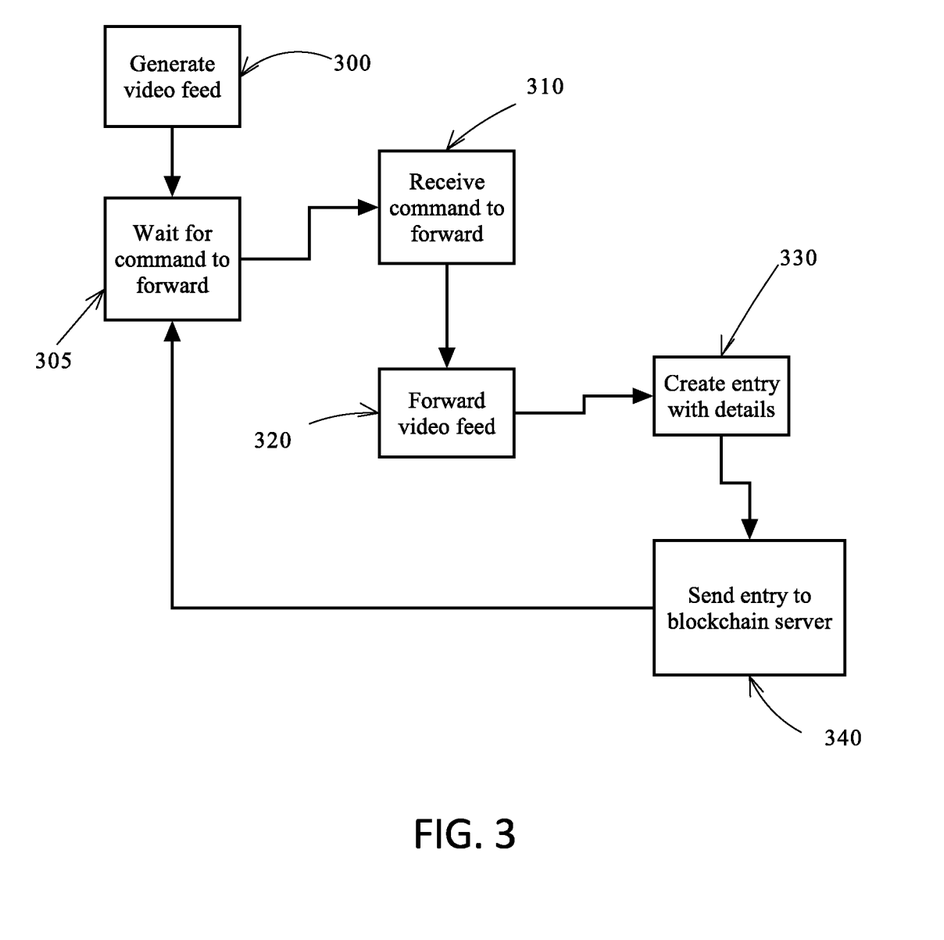
FIG. 3 is a flowchart detailing a blockchain based method according to another aspect of the present invention.

Referring to FIG. 3, the method noted above is illustrated by way of the flowchart in FIG. 3. In this method, the process starts at step 300, that of generating the video feed. In step 305, the system waits for a command to send the video feed to a destination IP address. Step 310 is that of receiving a command to send the video feed to a specific IP address. In step 320, the video feed is then sent to a destination IP address. Afterwards, the details regarding the video feed and the sending/forwarding of the video feed to a destination IP are created (step 330). Finally, the details about the sending of the video feed are sent to a blockchain server (step 340). The method then loops back to step 305 as the system awaits another command to send the video feed to another IP address.

It should be clear that the method outlined in FIG. 3 creates an immutable record of how the video feed is treated by the system as commanded by users. This record would, as explained above, detail the time/date stamps of actions taken, IP addresses of relevant parties (e.g. source IP addresses of commands, destination IP addresses for the video feed, etc.), fingerprint/hash data about the video feed, and identification of the cameras producing the video feed. The resulting records on the blockchain servers can then be used as necessary. Uses for the records may include use as evidence in court proceedings. As noted above, in one implementation, the data traffic generated by the video feeds within a monitored facility can be sent from the facility to one or more monitoring centres by way of the segregated network to ensure security and integrity of the resulting data transmission.

To further assist the emergency services dispatch or the emergency services personnel who are responding to an emergency situation, the video and/or data feed from a monitored facility may be forwarded to the emergency services dispatch that is local to where the facility is located. It should be clear that, as noted above, the monitoring center that reviews and/or monitors the video and/or data feeds from the monitored facility may be physically remote from the monitored facility. In fact, it may be that the monitored facility and the monitoring center are even in different countries (e.g. the facility may be located in Canada while the monitoring center is located in the United States)! The issue for such eventualities is clear—if the monitoring center detects an emergency situation at the monitored facility, the emergency services that need to be contacted are those that are local to the facility and not local to the monitoring center.

One option for the above is for the monitoring center to have access to contact information for authorities that are local to the facilities location. This may be implemented using a menu system that provides the operators/monitors at the monitoring station with options as to the location of the video feed being viewed. To forward the video feed being viewed and to contact the local authorities, the operators/monitors can call up a menu with options in a tree structure where the facility's location is progressively narrowed as one traverses the menu. Thus, in one implementation, the operator/monitor is first prompted for the country where the facility is located (e.g. US/Canada). Then, either the provinces or the states are shown as options to the operator/monitor. Once the state or province has been selected, then the town or city for the facility can be selected. It should be clear that, for the town or city menu, the towns or cities may be narrowed to only those where monitored facilities exist. Thus, if there are no monitored facilities in New York City but there are two in Albany and two in Buffalo, once the operator/monitor has narrowed the selection to the state of New York, then the only choices provided to the operator/monitor are Albany and Buffalo. If the facility with the emergency is in Albany, then selecting Albany will open up another menu that provides the two locations in that city for the monitored facilities. By selecting the correct facility, the correct address of the facility where the emergency is occurring can be provided to the emergency services personnel. As well, the video and/or data feed for that facility can also be forwarded to the proper local authorities for the facility with the emergency.

It should be clear that most local emergency services dispatch offices have dedicated IP addresses and dedicated emergency telephone lines. These can be programmed into the menu system such that, once the facility with the emergency has been pinpointed using the menu, the video/data feed can be forwarded to the IP address for the local emergency services dispatch and a call can be placed to the dedicated emergency line for that local emergency services dispatch. Preferably, the dedicated IP addresses and the dedicated emergency telephone numbers for these local authorities are shielded or hidden from the operator/monitor at the monitoring center. As can be imagined, in at least one instance, such dedicated IP addresses and emergency telephone lines are not available to the general public.

To assist in producing a video stream or video feed that can assist emergency services dispatch operators, individuals located at the monitored facility may be issued mobile devices that are capable of automatically activating the mobile device's cameras in the event a specific emergency number is entered in the telephone function of the mobile device. Preferably, these mobile devices are connected to the segregated private network explained above. By being connected to the segregated private network, the mobile device is provided with a secure communications link to the emergency services. The concept is that, once an emergency number is dialled on the mobile device (e.g. 911, 999, 112, etc.), the device automatically activates one or more cameras on the device. The resulting video feed or feeds are then automatically routed to the local emergency services dispatch office by way of the dedicated private network explained above. This allows the emergency services dispatch office to see at least some of the surrounding circumstances of the emergency. The mobile device may be configured to activate all cameras on the device or some of the cameras. The person contacting the emergency services dispatch office can simply point the mobile device towards the emergency so that emergency services dispatch can have a live video feed of the emergency. This way, the emergency services personnel on their way to the emergency can be informed of, at the very least, some of the circumstances surrounding the emergency.

It should be clear that the automatic activation of the mobile device video cameras can be implemented in many different ways. In one implementation, the mobile device is programmed to recognize when an emergency number is being dialled. This is akin to allowing emergency telephone calls to be made on a mobile device that is not equipped with a SIM card. Once the emergency number has been recognized, the mobile device can, as the call is being placed, activate one or more cameras without any input from the user. With the cameras activated, the resulting video feed is routed through the segregated private network to a known emergency services dispatch IP address. The video feed from the mobile device can be routed through the segregated private network to provide the emergency services with a live video and/or audio feed of the locale of the emergency.

In a variant of the above concept, instead of simply activating one or more cameras on the mobile device, the mobile device can be configured so that, once the emergency number has been dialled, audio and video feeds from the mobile device can be automatically activated. Or, in another variant, the speakerphone function may be automatically activated to provide a better audio feed from the mobile device at the location of the emergency. Accordingly, once the mobile device has detected that an emergency number has been dialled, one or more services on the mobile device can be automatically activated without the need for any intervention or action from the user. These services may include activation of one or more of the mobile device's camera, microphones, speakers, GPS functions, location functions, and/or flash/flashlights. Depending on the mobile device's configuration, any one or any combination of these functions or services of the mobile device can be automatically activated once an emergency number has been dialled on the mobile device.

It must be noted that the service or function that is automatically activated can also be deactivated. The deactivation may occur automatically, or it may be executed by the user. For automatic deactivation, the service or function may be deactivated once the emergency call has terminated. Thus, a user can dial an emergency number and would have his mobile device's camera automatically activated. Once the call, however, has terminated, then the camera can also be automatically deactivated by the mobile device.

As an alternative to or in addition to routing the output of the activated service or function of the mobile device to emergency services dispatch, the output of the service or function may be saved on the mobile device. This ensures that a record of the output of the service or function (e.g. an audio recording or a video recording or a GPS location) is saved and available as necessary. As well, the output may be forwarded to the emergency services dispatch. In one example, the GPS location function may be activated, and the GPS location of the mobile device can be forwarded to the emergency services dispatch. This ensures that the emergency services personnel would be routed to the correct location of the emergency.

The concept detailed above can be extended to other communications devices and to other audio-visual equipment with transmitting capabilities. As an example, the body cameras of law enforcement officers may be configured to transmit their images and their video feeds to a central monitoring station (or to a suitable police station or law enforcement outpost) by way of the segregated private network. This ensures that the data generated is not subject to hacking or interception by way of the Internet.

Figure 4:
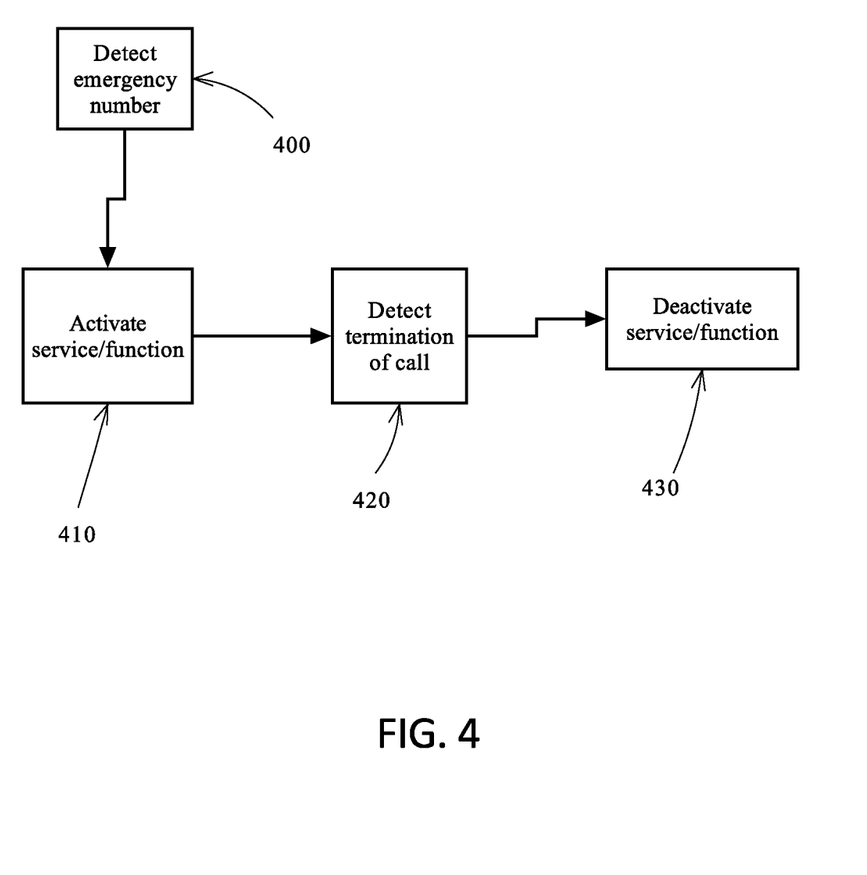
FIG. 4 is a flowchart detailing the steps in a method according to a further aspect of the present invention.

Referring to FIG. 4, a flowchart of the steps according to this aspect of the present invention is illustrated. The method begins at step 400, that of detecting that an emergency number has been dialled on the mobile device. Step 410 is that of automatically activating one or more services or functions on the mobile device. The output of the service or function may be sent to the emergency services dispatch by way of the segregated private network or it may be saved on the device, or both may be implemented. Step 420 is that of detecting that the emergency call has terminated and step 430 is that of deactivating the service or function.

In another aspect of the present invention, an emergency situation in one monitored facility can be used to automatically alert other monitored facilities about the emergency. This ensures that, if necessary, similar monitored facilities are on alert due to the emergency. As well, if necessary, emergency measures may be taken at those other monitored facilities.

The above concept may be implemented by automatically sending out a message to staff in the other monitored facility (e.g. security guards, maintenance personnel, administrative personnel) about the emergency at the monitored facility. This message may be sent out once the emergency has been detected (e.g. detected by monitors/operators at the monitoring center) or when emergency services have been contacted. Alternatively, the operators/monitors at the monitoring center may declare an emergency and, by doing so, cause an automatic alert message sent out to the other monitored facilities in the vicinity of the emergency. The alert message may provide details about the emergency at the monitored facility or the message may simply indicate that an emergency situation has occurred at the monitored facility and that personnel should be on alert.

The alert to the other monitored facilities may be sent by any suitable electronic means. As an example, text messages, SMS messaging, email, group online chats, and the like may be used to send out an alert to the staff at the other monitored facilities. These alerts to the other monitored facilities may, of course, be sent by way of the segregated network as outlined above.

It should be clear that the automatic alert may be limited by distance or locale. Thus, if two adjacent buildings are both monitored facilities, then an emergency in one should, just in case, cause an alert in the other. However, if the only two monitored facilities are at opposite ends of a large city, then an emergency in one monitored facility does not necessarily mean that an alert is to be sent to the other monitored facility. The automated alert may be configurable at the monitoring center such that the monitoring system can send out alerts that are city wide (i.e. all monitored facilities in a specific city are alerted if an emergency is declared at one facility), block wide, or even neighborhood wide. Of course, the emergency that causes alerts to be sent out to other monitored facilities need not occur at a monitored facility but may occur in the vicinity of a monitored facility. As an example, if a building next to a monitored facility is on fire, the monitoring center monitoring the monitored facility adjacent to the building on fire may declare an emergency and cause notifications and alerts to be sent out to monitored facilities within the area of the fire.

The segregated network outlined above can also be used in other ways to ensure secure communications between two parties. In one aspect of the present invention, the segregated network can be used to establish a point to point communications link between two-way radios. Thus, the two way radios are used to digitize, encrypt, and transmit voice data to one of the network access nodes. The digitized data is then transmitted through the segregated network to another network access node for transmission to the other two-way radio. Because of the use of the segregated network, the two two-way radios communicating with one another need not even be in the same locale.

The well-known technology of RoIP (radio over IP) can be used to implement this aspect of the invention. Instead of using the Internet or a Wi-Fi network to communicate between radios, the radios implementing this aspect of the invention can simply use the segregated network to communicate with one another.

The segregated network outlined above can also be used for other digital communication methods other than the above. As an example, instead of sending SMS (short messaging system) text messages by way of the Internet and/or a wireless carrier, the text messages can be sent by way of the segregated network explained above. Depending on the configuration of the device using this concept, the device for transmitting and receiving text messages can be pointed to the network access node for sending and receiving text messages. This ensures that the messages pass through a more secure network as opposed to passing through the various servers through the general Internet.

In addition to the above SMS messages, the segregated private network may be used to transport other communications between individuals. Thus, email, documents, and other communications between individuals equipped with suitably provisioned devices may be routed through the segregated private network as explained above.

To allow mobile communications devices to take advantage of the segregated private network even if they are not within the range of the access nodes, the mobile communications devices could be configured such that their data connection creates a VPN connection to a suitable access node to the segregated private network. The use of a VPN connection to the access node allows for a secure communications channel to be present for such mobile communications devices. While the VPN connection may traverse the Internet, the VPN encryption should provide a certain measure of communications security for the communications device.

It should be clear that the various aspects of the present invention may be implemented as software modules in an overall software system. As such, the present invention may thus take the form of computer executable instructions that, when executed, implements various software modules with predefined functions.

The embodiments of the invention may be executed by a computer processor or similar device programmed in the manner of method steps or may be executed by an electronic system which is provided with means for executing these steps. Similarly, an electronic memory means such as computer diskettes, CD-ROMs, Random Access Memory (RAM), Read Only Memory (ROM) or similar computer software storage media known in the art, may be programmed to execute such method steps. As well, electronic signals representing these method steps may also be transmitted via a communication network.

Embodiments of the invention may be implemented in any conventional computer programming language. For example, preferred embodiments may be implemented in a procedural programming language (e.g., "C" or "Go") or an object-oriented language (e.g., "C++", "java", "PHP", "PYTHON" or "C#"). Alternative embodiments of the invention may be implemented as preprogrammed hardware elements, other related components, or as a combination of hardware and software components.

Embodiments can be implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink-wrapped software), preloaded with a computer system (e.g., on system ROM or fixed disk), or distributed from a server over a network (e.g., the Internet or World Wide Web). Of course, some embodiments of the invention may be implemented as a combination of both software (e.g., a computer program product) and hardware. Still other embodiments of the invention may be implemented as entirely hardware, or entirely software (e.g., a computer program product).

A person understanding this invention may now conceive of alternative structures and embodiments or variations of the above all of which are intended to fall within the scope of the invention as defined in the claims that follow.

I claim:

1. A method for documenting a video stream from a video source, the method comprising:
   receiving said video stream;
   receiving a command to forward said video stream to a destination address;
   forwarding said video stream to said destination address along with a source address of said command;
   creating an entry including details about said video stream, wherein said details comprise at least said source address of said command; and
   sending said entry to a blockchain based storage server for storage,
   wherein said blockchain based storage server causes a duplication of said entry in at least one other blockchain based storage server,
   and wherein said blockchain based storage server is within a segregated private data network, said private data network being physically and logically segregated from other data networks and being physically and logically segregated from the Internet.

2. The method according to claim 1, wherein said video stream is forwarded to said destination address using a segregated private data network, said private data network being physically and logically segregated from other data networks and said private data network is physically and logically segregated from the Internet.

3. The method according to claim 2, wherein said destination address is within said segregated private data network.

4. The method according to claim 1, wherein said entry includes details about said destination address.

5. The method according to claim 1, wherein said video stream is encrypted at a video gateway and is decrypted at said destination address.

6. The method according to claim 1, wherein said method is executed at a video gateway that is within a segregated private data network, said private data network being physically and logically segregated from other data networks and said private data network is physically and logically segregated from the Internet.

* * * * *